United States Patent
Jiang et al.

(10) Patent No.: US 9,365,762 B1
(45) Date of Patent: Jun. 14, 2016

(54) COPOLYMER OF DIMER ACID-ORGANIC AMINE AND SHEAR STRENGTH IMPROVING AGENT OF WATER IN OIL EMULSION DRILLING FLUID AND DRILLING FLUID

(71) Applicant: China University of Petroleum (Beijing), Beijing—Changping District (CN)

(72) Inventors: Guancheng Jiang, Beijing (CN); Yinbo He, Beijing (CN); Xianbin Huang, Beijing (CN); Zhengqiang Deng, Beijing (CN)

(73) Assignee: China University of Petroleum (Beijing) (CN)

( * ) Notice: Subject to any disclaimer, the term of this patent is extended or adjusted under 35 U.S.C. 154(b) by 0 days.

(21) Appl. No.: 14/878,808

(22) Filed: Oct. 8, 2015

(30) Foreign Application Priority Data

May 27, 2015 (CN) .......................... 2015 1 0277996

(51) Int. Cl.
*C09K 8/36* (2006.01)

(52) U.S. Cl.
CPC ........................................ *C09K 8/36* (2013.01)

(58) Field of Classification Search
CPC ............. C09K 8/24; C09K 8/36; C09K 8/608
USPC ........................................................ 507/129
See application file for complete search history.

(56) References Cited

U.S. PATENT DOCUMENTS

| 3,647,694 | A | * | 3/1972 | Swanson | C07D 233/16 44/344 |
| 4,082,708 | A | * | 4/1978 | Mehta | C08G 69/265 525/423 |
| 5,393,901 | A | * | 2/1995 | Zima | C07C 231/02 554/154 |
| 5,582,792 | A | | 12/1996 | Dougherty et al. | |
| 6,077,900 | A | * | 6/2000 | Boudreaux | C08J 3/07 524/501 |
| 2003/0162938 | A1 | * | 8/2003 | Pavlin | A61K 8/042 528/310 |

FOREIGN PATENT DOCUMENTS

| CN | 102964306 A | 3/2013 |
| CN | 103261482 A | 8/2013 |
| WO | 2012089649 A1 | 7/2012 |

OTHER PUBLICATIONS

Notification of Grant of Patent Right for Invention for Chinese Patent Application No. 201510277996.5, including allowed claims, dated Jan. 13, 2016.
Zhang, Synthesis of Dimer Acid and Industrial Application, No. 6, Specialty Petrochemicals, 1995, at p. 71 (with English Abstract).

* cited by examiner

*Primary Examiner* — Aiqun Li
(74) *Attorney, Agent, or Firm* — Calfee, Halter & Griswold LLP

(57) ABSTRACT

The present subject matter relates to a dimer acid-organic amine copolymer, comprising structural units from a dimer acid, structural units from an alkyl amine, and structural units from an aromatic amine, wherein, the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl. The present subject matter provides a shearing strength improving agent for water in oil emulsion drilling fluids and a drilling fluid containing the shearing strength improving agent. The shearing strength improving agent provided in the present invention can be used to significantly improve the yield point, ratio of yield point to plastic viscosity, gel strength of water in oil emulsion drilling fluids even in a small concentration, and is applicable to water in oil emulsion drilling fluids that contain or don't contain organic clay.

18 Claims, No Drawings

COPOLYMER OF DIMER ACID-ORGANIC AMINE AND SHEAR STRENGTH IMPROVING AGENT OF WATER IN OIL EMULSION DRILLING FLUID AND DRILLING FLUID

CROSS REFERENCE TO RELATED APPLICATIONS

This application claims priority to Chinese Patent Application No. 201510277996.5 filed on May 27, 2015 and entitled "Copolymer of dimer acid-organic amine and Preparation Method and Use Thereof, Shear Strength Improving agent for Water in oil emulsion Drilling Fluids, and Water in oil emulsion Drilling Fluid", the entire content of which is fully incorporated here by reference.

FIELD OF THE INVENTION

The present subject matter relates to a dimer acid-organic amine copolymer and shear strength improving agent of water in oil emulsion drilling fluid and drilling fluid.

BACKGROUND OF THE INVENTION

Water in oil emulsion drilling fluids always have drawbacks such as low yield point, low ratio of yield point to plastic viscosity, and poor suspension property, etc., and can't effectively carry rock cuttings and suspend the weight materials contained in them owing to these drawbacks. In the actual drilling process, lowing shearing force may cause solid sedimentation during circulation of the water in oil emulsion drilling fluid, reduced bit penetration, increased solid concentration in the drilling fluid at the bottom of well, and thereby result in complex downhole conditions such as balled-up bit, etc. Water in oil emulsion drilling fluids usually employ organic clay as a viscosity and shearing strength improving agent and rely on the interaction between the organic clay and the water droplets in the invert oil emulsion to form a spatial grid structure to improve the yield point of the drilling fluid system. Different from the bentonite used in water-based drilling fluids, the organic clay has a low gel rate, and the surfactant contained in the organic clay may fall off at a high temperature and result in organic clay thickening and failure. As the well depth and the downhole temperature increase, in conjunction with the development of low-clay or clay-free high-performance water in oil emulsion drilling fluids, the requirement for shearing strength and suspension property of drilling fluids can't be met merely with organic clay.

At present, there are only a few types of shearing strength improving agents for water in oil emulsion drilling fluids in the world. These shearing strength improving agents for water in oil emulsion drilling fluids can be categorized into organic low molecular ones, rubber-based ones, and amphipathic molecular ones. Organic low molecular shearing strength improving agents mainly include low molecular alcohols, ketones, esters, and their mixtures, such as ethyl glycol, glycerol, carbonic allyl ester, and butyl acrylate, etc. Rubber-based shearing strength improving agents mainly include styr-butadiene rubber, ethyl-propyl rubber, and vinyl thermoplastic elastomers. Amphipathic molecular shearing strength improving agents are mainly chemical compounds that employ amide groups or ester groups as the polar groups and long chain alkyl groups as non-polar groups. However, these shearing strength improving agents have their drawbacks, mainly represented in: organic low molecular shearing strength improving agents excessively rely on an organic clay environment, can't take effect in drilling fluids without organic clay, and may have impacts on the stability of the water-in-oil emulsion; in addition, ketone or ester compounds have side effects on the environment; rubber-based shearing strength improving agents have a low shearing strength and are difficult to dissolve, and thereby are difficult to use in the field; amphipathic molecular shearing strength improving agents have a poor shearing strength improvement effect and may greatly increase the plastic viscosity, and thereby are adverse to the improvement of ratio of yield point to plastic viscosity of the water in oil emulsion drilling fluid.

SUMMARY OF THE INVENTION

The object of the present subject matter is to provide a dimer acid-organic amine copolymer that has high applicability, high fluidity and high temperature tolerance property, and can significantly improve the yield point, ratio of yield point to plastic viscosity, and gel strength of water in oil emulsion drilling fluids, a method for preparation of the dimer acid-organic amine copolymer, a shear strength improving agent for water in oil emulsion drilling fluids, and an water in oil emulsion drilling fluid.

To that end, the present subject matter provides a dimer acid-organic amine copolymer, comprising structural units from dimer acid, structural units from alkyl amine, and structural units from aromatic amine, wherein, the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl.

The present subject matter provides a method for preparation of a dimer acid-organic amine copolymer, comprising: reacting a dimer acid, an alkyl amine, and an aromatic amine to form a copolymer, wherein, the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl.

The present subject matter further provides a dimer acid-organic amine copolymer prepared with the method described above.

The present subject matter further provides an application of the above-mentioned dimer acid-organic amine copolymer and the copolymer prepared with the above-mentioned method as a shearing strength improving agent for water in oil emulsion drilling fluids.

The present subject matter further provides a shearing strength improving agent for water in oil emulsion drilling fluids, which contains the above-mentioned dimer acid-organic amine copolymer or the dimer acid-organic amine copolymer prepared with the above-mentioned method.

The present subject matter further provides an water in oil emulsion drilling fluid that contains the above-mentioned shearing strength improving agent for water in oil emulsion drilling fluids.

The dimer acid-organic amine copolymer provided in the present subject matter can form a spatial grid structure with enough strength by means of its association in the water in oil emulsion drilling fluid, and thereby can significantly improve the yield point, ratio of yield point to plastic viscosity, and gel strength of the water in oil emulsion drilling fluid even in a small concentration. In addition, when the dimer acid-organic amine copolymer provided in the present subject matter is used as a shearing strength improving agent, it can be used in water in oil emulsion drilling fluids that are free of organic clay, or can be used in water in oil emulsion drilling fluids that contain organic clay to exert a synergistic effect with the organic clay. Moreover, the shearing strength improving agent for water in oil emulsion drilling fluids provided in the present subject matter has favorable fluidity and temperature tolerance properties, and is easy to use in the field for well drilling.

Other aspects and advantages of the present subject matter will be further detailed in the embodiments hereunder.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

The present subject matter provides a dimer acid-organic amine copolymer, comprising structural units from a dimer acid, structural units from an alkyl amine, and structural units from an aromatic amine, wherein, the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl.

According to the present subject matter, the dimer acid is a dimeric fatty acid that contains two carboxylic groups, and is a dimer of oleic acid (CH3(CH2)7CH=CH(CH2)7COOH)) and linoleic acid (CH3(CH2)4CH=CHCH2CH=CH(CH2) 7COOH). Such a dimer acid can be obtained with a conventional method in the art (e.g., the method described in the literature "Zhang Shulin, Synthesis and Application of a Dimer Acid, Fine Petrochemical Technology, 1995", or a commercially available product (preferably a product with purity higher than 98%).

According to the present subject matter, to obtain a dimer acid-organic amine copolymer with properties more suitable for using as a shearing strength improving agent for water in oil emulsion drilling fluids, in another embodiment, the alkyl amine is one or more of dodecyl primary amine, tridecyl primary amine, tetradecyl primary amine, pentadecyl primary amine, hexadecyl primary amine, heptadecyl primary amine, and octodecyl primary amine, more preferably is dodecyl primary amine and/or octodecyl primary amine.

According to the present subject matter, to obtain a dimer acid-organic amine copolymer with properties more suitable for using as a shearing strength improving agent for water in oil emulsion drilling fluids, in another embodiment, the aromatic amine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline, more preferably is one or more of aniline, 2-methylaniline, 3-methylaniline, and 4-methylaniline.

In an embodiment of the present subject matter, the dimer acid is a dimer of oleic acid and linoleic acid, the alkyl amine is dodecyl primary amine or octodecyl primary amine, and the aromatic amine is aniline or 3-methylaniline.

According to the present subject matter, to obtain a shearing strength improving agent with absolute viscosity and molecular weight more suitable for using in water in oil emulsion drilling fluids, the molar ratio of the structural units from the dimer acid:the structural units from the alkyl amine: the structural units from the aromatic amine is 1:0.3-1:0.2-1, more preferably is 1:0.3-0.8:0.2-0.7, even more preferably is 1:0.4-0.7:0.3-0.6.

In another embodiment, the weight-average molecular weight of the dimer acid-organic amine copolymer is 2,200-9,000 g/mol, and the absolute viscosity of it is 20,000-150,000 cp. To obtain a dimer acid-organic amine copolymer more suitable for using as a shearing strength improving agent for water in oil emulsion drilling fluids, in another embodiment, the weight-average molecular weight of the copolymer of dimer acid-organic amine is 4,000-9,000 g/mol, and the absolute viscosity of it is 100,000-150,000 cp. In another embodiment, the weight-average molecular weight of the dimer acid-organic amine copolymer is 5,000-9,000 g/mol, and the absolute viscosity of it is 100,000-150,000 cp.

The present subject matter provides a method for preparation of a copolymer of dimer acid-organic amine, comprising: reacting a dimer acid, an alkyl amine, and an aromatic amine to form a copolymer, wherein, the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl.

According to the present subject matter, the dimer acid is a dimeric fatty acid that contains two carboxylic groups, and is a dimer of oleic acid (CH3(CH2)7CH=CH(CH2)7COOH)) and linoleic acid (CH3(CH2)4CH=CHCH2CH=CH(CH2) 7COOH). Such a dimer acid can be obtained with a conventional method in the art (e.g., the method described in the literature "Zhang Shulin, Synthesis and Application of a Dimer Acid, Fine Petrochemical Technology, 1995", or a commercially available product (preferably a product with purity higher than 98%).

According to the present subject matter, to obtain a dimer acid-organic amine copolymer with properties more suitable for using as a shearing strength improving agent for water in oil emulsion drilling fluids, in another embodiment, the alkyl amine is one or more of dodecyl primary amine, tridecyl primary amine, tetradecyl primary amine, pentadecyl primary amine, hexadecyl primary amine, heptadecyl primary amine, and octodecyl primary amine, more preferably is dodecyl primary amine and/or octodecyl primary amine.

According to the present subject matter, to obtain a dimer acid-organic amine copolymer with properties more suitable for using as a shearing strength improving agent for water in oil emulsion drilling fluids, in another embodiment, the aromatic amine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline, more preferably is one or more of aniline, 2-methylaniline, 3-methylaniline, and 4-methylaniline.

In another embodiment of the present subject matter, the dimer acid is a dimer of oleic acid and linoleic acid, the alkyl amine is dodecyl primary amine or octodecyl primary amine, and the aromatic amine is aniline or 3-methylaniline.

According to the present subject matter, the copolymerization reaction among the dimer acid, the alkyl amine, and the aromatic amine is mainly a dehydration-condensation reaction between carboxylic acid and amine group. Though a dimer acid-organic amine copolymer with properties favorable for using as a shearing strength improving agent for water in oil emulsion drilling fluids as long as the dimer acid, alkyl amine, and aromatic amine described in the present subject matter are used to have a copolymerization reaction, in another embodiment, the molar ratio of the dimer acid:the alkyl amine:the aromatic amine is 1:0.3-1:0.2-1, more preferably is 1:0.3-0.8:0.2-0.7, even more preferably is 1:0.4-0.7: 0.3-0.6, in order to obtain a shearing strength improving agent with absolute viscosity and molecular weight more suitable for using in water in oil emulsion drilling fluids.

According to the present subject matter, the copolymerization reaction can proceed in a conventional way in the art, as long as a dimer acid-organic amine copolymer serving as a shearing strength improving agent for water in oil emulsion drilling fluids can be obtained. In another embodiment, the dimer acid, alkyl amine, and aromatic amine are mixed to obtain a mixture of monomers before they are controlled to have a copolymerization reaction; then, the obtained mixture of monomers is controlled to have a copolymerization reaction with concentrated sulfuric acid in presence.

According to the present subject matter, if the dimer acid, alkyl amine and aromatic amine are mixed to obtain a mixture of monomers before they are controlled to have a copolymerization reaction, the monomers can have a contact reaction more intensively in the subsequent polymerization reaction. In view that the mixture of monomers is viscous, preferably the monomers are mixed at a high temperature; particularly preferred mixing conditions include: temperature is 100-130° C., time is 20-30 min.

According to the present subject matter, the concentrated sulfuric acid is used as a catalyst in the copolymerization reaction described in the present subject matter, and there is no particular restriction on the concentration of the concentrated sulfuric acid, as long as the concentrated sulfuric acid can catalyze the copolymerization reaction described in the present subject matter. In another embodiment, based on the total weight of the dimer acid, alkyl amine, and aromatic amine, the concentration of the concentrated sulfuric acid is 0.3-1 wt. %. The concentrated sulfuric acid can be a sulfuric acid solution with sulfuric acid concentration higher than 95 wt. % (preferably 98 wt. %).

According to another embodiment of the present subject matter, the conditions of the copolymerization reaction include: 150-180° C. reaction temperature and 2-6 h reaction time. In another embodiment, the conditions of the copolymerization reaction include: temperature is 155-175° C., time is 2-6 h. In another embodiment, the conditions of the copolymerization reaction include: temperature is 160-170° C., time is 2-6 h.

To promote the copolymerization reaction, the water byproduct from the copolymerization reaction can be removed from the reaction system. The water byproduct removing method can be a conventional method in the art, and will not be detailed here.

The present subject matter further provides a dimer acid-organic amine copolymer prepared with the method described above.

According to the present subject matter, it is seen from the above description: since the dimer acid-organic amine copolymer in the present subject matter is obtained through copolymerization of the dimer acid, alkyl amine, and aromatic amine, it should at least contain structural units from the dimer acid, alkyl amine, and aromatic amine.

In another embodiment, the weight-average molecular weight of the dimer acid-organic amine copolymer is 2,200-9,000 g/mol, and the absolute viscosity of it is 20,000-150,000 cp. To obtain a dimer acid-organic amine copolymer more suitable for using as a shearing strength improving agent for water in oil emulsion drilling fluids, in another embodiment, the weight-average molecular weight of the dimer acid-organic amine copolymer is 4,000-9,000 g/mol, and the absolute viscosity of it is 100,000-150,000 cp. In another embodiment, the weight-average molecular weight of the dimer acid-organic amine copolymer is 5,000-9,000 g/mol, and the absolute viscosity of it is 100,000-150,000 cp.

In the present subject matter, the weight-average molecular weight is weight-average molecular weight measured by gel permeation chromatography (GPC), and the absolute viscosity is absolute viscosity measured with a Brookfield viscometer.

The present subject matter further provides an application of the above-mentioned dimer acid-organic amine copolymer and the dimer acid-organic amine copolymer prepared with the above-mentioned method as a shearing strength improving agent for water in oil emulsion drilling fluids. It should be understood that the application of the dimer acid-organic amine copolymer as a shearing strength improving agent for water in oil emulsion drilling fluids refers to an application of the dimer acid-organic amine copolymer obtained in the present subject matter as a shearing strength improving agent for water in oil emulsion drilling fluids or an application of a mixture of the dimer acid-organic amine copolymer obtained in the present subject matter and other substances as a shearing strength improving agent for water in oil emulsion drilling fluids.

The present subject matter further provides a shearing strength improving agent for water in oil emulsion drilling fluids, which contains the above-mentioned dimer acid-organic amine copolymer or the dimer acid-organic amine copolymer prepared with the above-mentioned method.

The shearing strength improving agent for water in oil emulsion drilling fluids containing the dimer acid-organic amine copolymer provided in the present subject matter can form a spatial grid structure with enough strength by means of the association of the dimer acid-organic amine copolymer in the water in oil emulsion drilling fluid, and thereby can significantly improve the yield point, ratio of yield point to plastic viscosity, and gel strength of the water in oil emulsion drilling fluid even in a small concentration. Hence, in other words, in the shearing strength improving agent provided in the present subject matter, the dimer acid-organic amine copolymer can be deemed as an active ingredient that enables the shearing strength improving agent to take effect.

In another embodiment, based on the total weight of the shearing strength improving agent for water in oil emulsion drilling fluids, the content of the dimer acid-organic amine copolymer is 50-100 wt. %, more preferably is 50-70 wt. %.

If the dimer acid-organic amine copolymer is prepared with the method described above, such a shearing strength improving agent can be the dimer acid-organic amine copolymer prepared with the method described above, or the dimer acid-organic amine copolymer directly diluted with a diluent to 50-70 wt. % concentration (i.e., based on the total weight of the diluted dimer acid-organic amine copolymer solution, the content of the dimer acid-organic amine copolymer is 50-70 wt. %), or the shearing strength improving agent containing the dimer acid-organic amine copolymer disclosed in the present subject matter, which is prepared with a method well known in the art.

Those skilled in the art should appreciate: usually the product of a copolymerization reaction is not treated by separate; instead, it is believed that the monomers have essentially reacted completely in the copolymerization reaction, and the product of the copolymerization reaction is directly used as a copolymer. Hence, for the purpose of convenience, the diluent can be directly added into the reaction products of the copolymerization reaction after the copolymerization reaction in the method for preparation of the dimer acid-organic amine copolymer is completed, without purification or separation of the dimer acid-organic amine copolymer in the reaction product. Generally, the dimer acid-organic amine copolymer described in the present subject matter also refers to the product of the copolymerization reaction without purification or separation, or refers to the product of the copolymerization reaction from which the water byproduct has been removed.

The diluent can be a diluent commonly used in the art, such as tall oil and/or tall oil fatty acid.

The present subject matter further provides a water in oil emulsion drilling fluid that contains the above-mentioned shearing strength improving agent for water in oil emulsion drilling fluids.

The shearing strength improving agent that contains the dimer acid-organic amine copolymer in the present subject matter has a favorable temperature tolerance property, and can significantly improve the yield point, ratio of yield point to plastic viscosity, and gel strength of the water in oil emulsion drilling fluid even in a small concentration. There is no particular restriction on the content of the shearing strength improving agent in the water in oil emulsion drilling fluid; in other words, the content of the shearing strength improving agent in the water in oil emulsion drilling fluid can be selected appropriately according to the specific circumstance. In another embodiment, in the water in oil emulsion drilling fluid, the content of the dimer acid-organic amine copolymer is 0.5-1 wt. %. If the dimer acid-organic amine copolymer solution diluted with a diluent is used directly as a shearing strength improving agent, the content of the shearing strength improving agent in the water in oil emulsion drilling fluid preferably is 1-1.5 wt. %, on the premise of ensuring appropriate content of the dimer acid-organic amine copolymer (e.g., 0.5-1 wt. %).

The dimer acid-organic amine copolymer provided in the present subject matter can form a spatial grid structure with enough strength by means of its association in the water in oil emulsion drilling fluid, and thereby can significantly improve the yield point, ratio of yield point to plastic viscosity, and gel strength (initial gel strength and final gel strength) of the water in oil emulsion drilling fluid even in a small concentration.

In addition, when the dimer acid-organic amine copolymer provided in the present subject matter is used as a shearing strength improving agent, it can be used in water in oil emulsion drilling fluids that are free of organic clay, or can be used in water in oil emulsion drilling fluids that contain organic clay to exert a synergistic effect with the organic clay.

Moreover, when the dimer acid-organic amine copolymer provided in the present subject matter is used as a shearing strength improving agent, it has favorable fluidity and is easy to use in the field for well drilling.

Hereunder the present subject matter will be further detailed in some embodiments.

Wherein, the weight-average molecular weight is measured by gel permeation chromatography (GPC); the absolute viscosity is measured with a Brookfield viscometer.

Example 1

This example is provided to describe the dimer acid-organic amine copolymer and the preparation method and use thereof according to the present subject matter.
(1) Add dimer acid (dimer acid Pripol 1013 from Shanghai Heribit Chemical Co., Ltd., the same below), dodecyl primary amine and aniline at 1:0.5:0.5 molar ratio into a reaction vessel, and agitate for 30 min at 120±2° C., to obtain a monomer mixture that is mixed to a homogeneous state;
(2) Add concentrated sulfuric acid (at 98 wt. % concentration, the quantity added is 0.5 wt. % of the monomer mixture) in droplets into the monomer mixture (within approx 2 min), and control the reaction to proceed for 2 h at 160±5° C., with a condensate drain facility deployed; the reaction product is a copolymer of dimer acid-organic amine, with 6,500 g/mol weight-average molecular weight and 125,000 cp absolute viscosity.

Add tall oil diluent (Tall Oil F1 from Jinan Jinquan Chemical Co., Ltd., the same below) into the dimer acid-organic amine copolymer to dilute the dimer acid-organic amine copolymer to 50 wt. % concentration, so as to obtain a shearing strength improving agent A1 disclosed in the present subject matter; the liquid is an orange liquid.

Example 2

This example is provided to describe the dimer acid-organic amine copolymer and the preparation method and use thereof according to the present subject matter.
(1) Add dimer acid, dodecyl primary amine and aniline at 1:0.4:0.6 molar ratio into a reaction vessel, and agitate for 30 min at 120±2° C., to obtain a monomer mixture that is mixed to a homogeneous state;
(2) Add concentrated sulfuric acid (at 98 wt. % concentration, the quantity added is 0.7 wt. % of the monomer mixture) in droplets into the monomer mixture (within approx 2 min), and control the reaction to proceed for 4 h at 170±5° C., with a condensate drain facility deployed; the reaction product is a copolymer of dimer acid-organic amine, with 5,300 g/mol weight-average molecular weight and 110,000 cp absolute viscosity.

Add tall oil diluent (Tall Oil HARTALL FA-1 from Shanghai Demand Chemical Co., Ltd., the same below) into the dimer acid-organic amine copolymer to dilute the dimer acid-organic amine copolymer to 70 wt. % concentration, so as to obtain a shearing strength improving agent A2 disclosed in the present subject matter; the liquid is an orange liquid.

Example 3

This example is provided to describe the dimer acid-organic amine copolymer and the preparation method and use thereof according to the present subject matter.
(1) Add dimer acid, dodecyl primary amine and 3-methylaniline at 1:0.5:0.5 molar ratio into a reaction vessel, and agitate for 30 min at 120±2° C., to obtain a monomer mixture that is mixed to a homogeneous state;
(2) Add concentrated sulfuric acid (at 98 wt. % concentration, the quantity added is 0.5 wt. % of the monomer mixture) in droplets into the monomer mixture (within approx 2 min), and control the reaction to proceed for 6 h at 170±5° C., with a condensate drain facility deployed; the reaction product is a copolymer of dimer acid-organic amine, with 6,000 g/mol weight-average molecular weight and 118,000 cp absolute viscosity.

Add tall oil diluent into the dimer acid-organic amine copolymer to dilute the dimer acid-organic amine copolymer to 70 wt. % concentration, so as to obtain a shearing strength improving agent A3 disclosed in the present subject matter; the liquid is an orange liquid.

Example 4

This example is provided to describe the dimer acid-organic amine copolymer and the preparation method and use thereof according to the present subject matter.
(1) Add dimer acid, dodecyl primary amine and 3-methylaniline at 1:0.6:0.4 molar ratio into a reaction vessel, and agitate for 30 min at 110±2° C., to obtain a monomer mixture that is mixed to a homogeneous state;
(2) Add concentrated sulfuric acid (at 98 wt. % concentration, the quantity added is 1 wt. % of the monomer mixture) in droplets into the monomer mixture (within approx 2 min), and control the reaction to proceed for 6 h at 160±5° C., with a condensate drain facility deployed; the reaction product is a copolymer of dimer acid-organic amine, with 7,100 g/mol weight-average molecular weight and 131,000 cp absolute viscosity.

Add tall oil fatty acid diluent into the dimer acid-organic amine copolymer to dilute the dimer acid-organic amine copolymer to 50 wt. % concentration, so as to obtain a shearing strength improving agent A4 disclosed in the present subject matter; the liquid is an orange red liquid.

Example 5

According to the method described in the example 1, but the difference is the molar ratio of the dimer acid:octodecyl primary amine:aniline monomers is 1:0.5:0.5, and the reaction product is a dimer acid-organic amine copolymer with 9,000 g/mol weight-average molecular weight and 148,000 cp absolute viscosity; and then a shearing strength improving agent A5 disclosed in the present subject matter is obtained, and the liquid is an orange red liquid.

Example 6

According to the method described in the example 1, but the difference is the molar ratio of the dimer acid:octodecyl primary amine:3-methylaniline monomers is 1:0.6:0.3, and the reaction product is a dimer acid-organic amine copolymer with 8,400 g/mol weight-average molecular weight and 139,000 cp absolute viscosity; and then a shearing strength improving agent A6 disclosed in the present subject matter is obtained, and the liquid is an orange red liquid.

Example 7

According to the method described in the example 1, but the difference is the molar ratio of the dimer acid:dodecyl primary amine:aniline monomers is 1:0.8:0.7, and the reaction product is a dimer acid-organic amine copolymer with 4,500 g/mol weight-average molecular weight and 95,000 cp absolute viscosity; and then a shearing strength improving agent A7 disclosed in the present subject matter is obtained, and the liquid is an orange liquid.

Example 8

According to the method described in the example 1, but the difference is the molar ratio of the dimer acid:dodecyl primary amine:aniline monomers is 1:0.3:0.2, and the reaction product is a dimer acid-organic amine copolymer with 2,800 g/mol weight-average molecular weight and 23,000 cp absolute viscosity; and then a shearing strength improving agent A8 disclosed in the present subject matter is obtained, and the liquid is an orange liquid.

Example 9

According to the method described in the example 1, but the difference is mixing the monomers in step (1) at 180° C. while agitating for 30 min, and then directly executing step (2); the reaction product is a copolymer of dimer acid-organic amine, with 3,300 g/mol weight-average molecular weight and 42,000 cp absolute viscosity; then, a shearing strength improving agent A9 disclosed in the present subject matter is obtained, and the liquid is an orange liquid.

Comparative Example 1

According to the method described in the example 1, but n-amylamine is used as one of the monomers to replace dodecyl primary amine, and the reaction product is a dimer acid-organic amine copolymer with 3,800 g/mol weight-average molecular weight and 55,000 cp absolute viscosity; and then a shearing strength improving agent D1 disclosed in the present subject matter is obtained, and the liquid is an orange liquid.

Comparative Example 2

According to the method described in the example 1, but the monomers are dimer acid and dodecyl primary amine at 1:1 molar ratio, without aniline; the reaction product has 3,900 g/mol weight-average molecular weight and 57,000 cp absolute viscosity; then, a shearing strength improving agent D2 described in the present subject matter is obtained, and the liquid is an orange liquid.

Comparative Example 3

According to the method described in the example 1, but the monomers are dimer acid and aniline at 1:1 molar ratio, without dodecyl primary amine; the reaction product has 3,400 g/mol weight-average molecular weight and 44,000 cp absolute viscosity; then, a shearing strength improving agent D3 described in the present subject matter is obtained, and the liquid is an orange liquid.

Test Example 1

(1) Prepare two types of base muds of water in oil emulsion drilling fluid, wherein, base mud X is a base mud of water in oil emulsion drilling fluid that contains organic clay, while base mud Y is a base mud of water in oil emulsion drilling fluid free of organic clay; the primary emulsifier VERSAMUL and the auxiliary emulsifier VERSACOAT in the formulation are purchased from M-I SWACO, the filtrate reducer ADAPTA is purchased from Baroid, and the organic clay is purchased from Weifang Huawei Technology Co., Ltd. The formulation is as follows:

Base mud X: 2.5 wt. % primary emulsifier VERSAMUL+1 wt. % auxiliary emulsifier VERSACOAT+2% organic clay+2.5 wt. % filtrate reducer ADAPTA+4 wt. % CaO, the remaining content consists of a mixture of White Oil 5# and 30 wt. % CaCl2 solution (at 80:20 oil-water ratio) and inevitable impurities;

Base mud Y: 2.5 wt. % primary emulsifier VERSAMUL+ 0.5 wt. % auxiliary emulsifier VERSACOAT+2.5 wt. % filtrate reducer ADAPTA+4 wt. % CaO, the remaining content consists of a mixture of White Oil 5# and 30 wt. % CaCl2 solution (at 80:20 oil-water ratio) and inevitable impurities.

(2) Take 300 mL base mud X and base mud Y and agitate the base muds for 20 min at 3,000 r/min speed in an agitator respectively, and the measure the yield point, ratio of yield point to plastic viscosity, initial gel strength and final gel strength with a six-speed rotational viscometer;

Take 300 mL base mud X and base mud Y and add 1 wt. % (based on the weight of the base mud) shearing strength improving agents A1-A9 obtained in the examples described above, shearing strength improving agents D1-D3 obtained in the comparative examples, or shearing strength improving agent HRP (from M-I SWACO) (see Table 1 for the formulation), agitate for 20 min at 3,000 r/min speed in an agitator, and then measure the yield point, ratio of yield point to plastic viscosity, initial gel strength, and final gel strength of the base muds with a six-speed rotational viscometer respectively.

Wherein, the φ600 and φ300 values are measured with the six-speed rotational viscometer sequentially, and the yield point and the ratio of yield point to plastic viscosity are calculated with the following expressions:

Yield point (YP): YP=0.511×(2×φ300−φ600)

Ratio of yield point to plastic viscosity:

$$YP/PV = \frac{YP}{\phi 600 - \phi 300}$$

Initial gel strength: agitate for 10 s at 600 r/min speed, hold for 10 s, and read the maximum reading at φ3, and then divided the maximum reading by 2 to obtain initial gel strength.

Final gel strength: agitate for 10 s at 600 r/min speed, hold for 10 min, and read the maximum reading at φ3, and then divided the maximum reading by 2 to obtain final gel strength.

The results are shown in Table 1:

TABLE 1

| Sample | YP Pa | YP/PV Pa · (mPa · s)$^{-1}$ | Initial Gel Strength Pa | Final Gel Strength Pa |
|---|---|---|---|---|
| X | 7.66 | 0.17 | 3 | 4 |
| X + 1 wt. % A1 | 14.31 | 0.304 | 5.5 | 8 |
| X + 1 wt. % A2 | 12.78 | 0.278 | 5 | 7.5 |
| X + 1 wt. % A3 | 13.29 | 0.289 | 5 | 8 |
| X + 1 wt. % A4 | 15.84 | 0.344 | 6 | 8.5 |
| X + 1 wt. % A5 | 16.86 | 0.366 | 6 | 9 |
| X + 1 wt. % A6 | 15.84 | 0.337 | 6 | 8.5 |
| X + 1 wt. % A7 | 11.75 | 0.25 | 4 | 5 |
| X + 1 wt. % A8 | 10.73 | 0.228 | 4 | 5 |
| X + 1 wt. % A9 | 10.73 | 0.224 | 4 | 5 |
| X + 1 wt. % D1 | 9.2 | 0.204 | 3 | 4 |
| X + 1 wt. % D2 | 10.22 | 0.227 | 3 | 4 |
| X + 1 wt. % D3 | 8.18 | 0.182 | 3 | 4 |
| X + 1 wt. % HRP | 10.22 | 0.217 | 4 | 5 |
| Y | 6.13 | 0.15 | 2 | 2.5 |
| Y + 1 wt. % A1 | 12.78 | 0.297 | 4.5 | 6 |
| Y + 1 wt. % A2 | 11.24 | 0.268 | 4 | 5.5 |
| Y + 1 wt. % A3 | 11.75 | 0.28 | 4 | 6 |
| Y + 1 wt. % A4 | 14.31 | 0.341 | 4.5 | 6.5 |
| Y + 1 wt. % A5 | 15.33 | 0.365 | 4.5 | 6.5 |
| Y + 1 wt. % A6 | 14.31 | 0.333 | 4.5 | 6.5 |
| Y + 1 wt. % A7 | 10.22 | 0.238 | 3 | 3.5 |
| Y + 1 wt. % A8 | 9.2 | 0.214 | 3 | 3.5 |
| Y + 1 wt. % A9 | 9.2 | 0.209 | 3 | 3.5 |
| Y + 1 wt. % D1 | 7.66 | 0.187 | 2 | 2.5 |
| Y + 1 wt. % D2 | 8.69 | 0.212 | 2 | 2.5 |
| Y + 1 wt. % D3 | 6.64 | 0.162 | 2 | 2.5 |
| Y + 1 wt. % HRP | 8.69 | 0.202 | 2.5 | 3 |

It can be seen from the data in Table 1: the shearing strength improving agent for water in oil emulsion drilling fluids disclosed in the present subject matter can greatly improve yield point, ratio of yield point to plastic viscosity, initial gel strength and final gel strength of the drilling fluid, and its effect is superior to that of a similar foreign product HRP.

Test Example 2

Assessment of Temperature Tolerance Property

Pour 200 ml drilling fluid to be tested into an aging can, and load the aging can into a roller furnace and roll for 16 h at 180° C. After hot rolling, take out the drilling fluid from the aging can, cool down to room temperature, and measure yield point, ratio of yield point to plastic viscosity, initial gel strength, and final gel strength with the method described in test example 1. The results are shown in Table 2.

TABLE 2

| Sample | YP Pa | YP/PC Pa · (mPa · s)$^{-1}$ | Initial Gel Strength Pa | Final Gel Strength Pa |
|---|---|---|---|---|
| X | 3.58 | 0.066 | 1 | 1.5 |
| X + 1 wt. % A1 | 10.22 | 0.182 | 3 | 4 |
| X + 1 wt. % A2 | 8.69 | 0.158 | 3 | 3.5 |
| X + 1 wt. % A3 | 9.2 | 0.167 | 3 | 3.5 |
| X + 1 wt. % A4 | 11.75 | 0.214 | 3.5 | 4 |
| X + 1 wt. % A5 | 12.78 | 0.232 | 3.5 | 4.5 |
| X + 1 wt. % A6 | 11.75 | 0.21 | 3.5 | 4 |
| X + 1 wt. % A7 | 7.66 | 0.137 | 1.5 | 2 |
| X + 1 wt. % A8 | 6.64 | 0.119 | 1.5 | 2 |
| X + 1 wt. % A9 | 6.64 | 0.116 | 1.5 | 2 |
| X + 1 wt. % D1 | 5.11 | 0.095 | 1 | 1.5 |
| X + 1 wt. % D2 | 6.13 | 0.113 | 1 | 1.5 |
| X + 1 wt. % D3 | 4.09 | 0.076 | 1 | 1.5 |
| X + 1 wt. % HRP | 6.13 | 0.11 | 2 | 2.5 |
| Y | 4.09 | 0.087 | 1 | 1 |
| Y + 1 wt. % A1 | 10.73 | 0.22 | 2.5 | 3.5 |
| Y + 1 wt. % A2 | 9.2 | 0.192 | 2 | 3 |
| Y + 1 wt. % A3 | 9.71 | 0.202 | 2.5 | 4 |
| Y + 1 wt. % A4 | 12.26 | 0.256 | 3 | 4.5 |
| Y + 1 wt. % A5 | 13.29 | 0.277 | 3 | 4.5 |
| Y + 1 wt. % A6 | 12.26 | 0.25 | 3 | 4.5 |
| Y + 1 wt. % A7 | 8.18 | 0.167 | 1.5 | 2 |
| Y + 1 wt. % A8 | 7.15 | 0.146 | 1.5 | 2 |
| Y + 1 wt. % A9 | 7.15 | 0.143 | 1.5 | 2 |
| Y + 1 wt. % D1 | 5.62 | 0.12 | 1 | 1 |
| Y + 1 wt. % D2 | 6.64 | 0.141 | 1 | 1 |
| Y + 1 wt. % D3 | 4.6 | 0.098 | 1 | 1 |
| Y + 1 wt. % HRP | 6.64 | 0.136 | 1.5 | 2 |

It can be seen from the data in Table 2: the shearing strength improving agent for water in oil emulsion drilling fluids disclosed in the present subject matter have a favorable temperature tolerance property, and still greatly improves yield point, ratio of yield point to plastic viscosity, initial gel strength and ten-min gel strength of the drilling fluid even after it is aged at 180° C. Compared with a similar foreign product HRP, the four rheological parameters of the shearing strength improving agent disclosed in the present subject matter after hot rolling are less degraded, and the temperature tolerance property is better.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

What is claimed is:

1. A shear strength improving agent for water-in-oil emulsion drilling fluids comprising a dimer acid-organic amine copolymer, which comprises structural units from dimer acid, structural units from alkyl amine, and structural units from aromatic amine, wherein the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl, wherein based on the total weight of the shear strength improving agent for water-in-oil emulsion drilling fluids, the copolymer is present in an amount of 50-70 wt. %.

2. The shear strength improving agent according to claim 1, wherein the alkyl amine is one or more of dodecyl amine, tridecyl amine, tetradecyl amine, pentadecyl amine, hexadecyl amine, heptadecyl amine, and octodecyl amine; and the aromatic amine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline.

3. The shear strength improving agent according to claim 2, wherein a molar ratio of the structural units from the dimer acid:the structural units from the alkyl amine:the structural units from the aromatic amine is 1:0.3-1:0.2-1.

4. The shear strength improving agent according to claim 3, wherein the molar ratio of the structural units from the dimer acid:the structural units from the alkyl amine:the structural units from the aromatic amine is 1:0.3-0.8:0.2-0.7.

5. The shear strength improving agent according to claim 4, wherein the molar ratio of the structural units from the dimer acid:the structural units from the alkyl amine:the structural units from the aromatic amine is 1:0.4-0.7:0.3-0.6.

6. The shear strength improving agent according to claim 1, wherein the dimer acid-organic amine copolymer is formed by reacting the dimer acid, alkyl amine, and aromatic amine in a copolymerization reaction, wherein the dimer acid is a dimer of oleic acid and linoleic acid, the alkyl amine is one or more of C10-C20 alkyl primary amines, and the aromatic amine is one or more of aniline and aniline with one or more sites on the benzene ring substituted by C1-C3 alkyl.

7. The shear strength improving agent according to claim 6, wherein the alkyl amine is one or more of dodecyl amine, tridecyl amine, tetradecyl amine, pentadecyl amine, hexadecyl amine, heptadecyl amine, and octodecyl amine; and the aromatic amine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline.

8. The shear strength improving agent according to claim 7, wherein a molar ratio of the dimer acid:the alkyl amine:the aromatic amine is 1:0.3-1:0.2-1.

9. The shear strength improving agent according to claim 8, wherein the molar ratio of the dimer acid:the alkyl amine:the aromatic amine is 1:0.3-0.8:0.2-0.7.

10. The shear strength improving agent according to claim 9, wherein the molar ratio of the dimer acid:the alkyl amine:the aromatic amine is 1:0.4-0.7:0.3-0.6.

11. The shear strength improving agent according to claim 6, wherein the copolymer is formed by mixing the dimer acid, alkyl amine, and aromatic amine to obtain a monomer mixture, and adding sulfuric acid to the monomer mixture to form the copolymer.

12. The shear strength improving agent according to claim 11, wherein the sulfuric acid is added in concentration of 0.3-1 wt. %. based on the total weight of the dimer acid, alkyl amine and aromatic amine.

13. The shear strength improving agent according to claim 11, wherein the conditions of the mixing comprise: a temperature of 100-130° C. and a time of 20-30 min.

14. The shear strength improving agent according to claim 6, wherein the conditions of the copolymerization reaction comprise: a temperature of 150-180° C. and a time of 2-6 h.

15. The shear strength improving agent according to claim 6, wherein a weight-average molecular weight of the copolymer is 2,200-9,000 g/mol, and the absolute viscosity of the copolymer is 20,000-150,000 cp.

16. The shear strength improving agent according to claim 15, wherein a weight-average molecular weight of the copolymer is 4,000-9,000 g/mol, and the absolute viscosity of the copolymer is 100,000-150,000 cp.

17. A water-in-oil emulsion drilling fluid comprising the shear strength improving agent for water in oil emulsion drilling fluids according to claim 1.

18. The water-in-oil emulsion drilling fluid according to claim 17, wherein the copolymer comprises 0.5-1 wt. % of the water-in-oil emulsion drilling fluid.

* * * * *